United States Patent
Russ

(10) Patent No.: US 10,295,042 B2
(45) Date of Patent: May 21, 2019

(54) TUNED RAT DRIVESHAFT

(71) Applicant: Hamilton Sundstrand Corporation, Charlotte, NC (US)

(72) Inventor: David Everett Russ, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 696 days.

(21) Appl. No.: 14/989,561

(22) Filed: Jan. 6, 2016

(65) Prior Publication Data
US 2017/0191559 A1    Jul. 6, 2017

(51) Int. Cl.
*F16C 3/02*    (2006.01)
*F16H 57/00*   (2012.01)
*B64D 41/00*   (2006.01)
*F16C 19/54*   (2006.01)
*F16D 1/06*    (2006.01)

(52) U.S. Cl.
CPC ....... *F16H 57/0025* (2013.01); *B64D 41/007* (2013.01); *F16C 3/02* (2013.01); *F16C 19/546* (2013.01); *F16C 2326/06* (2013.01); *F16C 2326/43* (2013.01); *F16C 2360/23* (2013.01); *F16D 1/06* (2013.01); *Y02T 50/44* (2013.01)

(58) Field of Classification Search
CPC ...... F16C 3/02; F16C 19/546; F16H 59/0025; B64D 41/007
See application file for complete search history.

(56) References Cited

U.S. PATENT DOCUMENTS

| | | | | |
|---|---|---|---|---|
| 5,174,719 A | * | 12/1992 | Walsh | B64D 41/007 184/6.11 |
| 2002/0020243 A1 | * | 2/2002 | Ziegert | F16F 15/12 74/490 |
| 2007/0297907 A1 | * | 12/2007 | Giebmanns | F01D 5/025 416/204 R |

(Continued)

FOREIGN PATENT DOCUMENTS

WO    02098736 A1    12/2002

OTHER PUBLICATIONS

Armid Tr 78001, Isakower, Nov. 1978.*
(Continued)

*Primary Examiner* — Woody A Lee, Jr.
(74) *Attorney, Agent, or Firm* — Cantor Colburn LLP

(57) ABSTRACT

A driveshaft for an aircraft ram air turbine, the driveshaft including a cylindrical body having an outer surface, an inner surface, a longitudinal axis, a first end section, a second end section opposite the first end section, and an elongated intermediate section connecting the first end section and the second end section. The outer surfaces of the elongated intermediate section includes at least three separate grooves initiating at a location proximate to the first end section and extending parallel to the longitudinal axis across the outer surface to a location proximate to the second end section, the grooves being separated equidistantly around a circumference of the outer surface. The grooves provide a high lateral bending stiffness and low torsional stiffness such that a drivetrain operates at a frequency below an operating range frequency and the driveshaft at a critical speed above an operating speed.

14 Claims, 7 Drawing Sheets

(56) References Cited

U.S. PATENT DOCUMENTS

| | | | |
|---|---|---|---|
| 2011/0309632 A1* | 12/2011 | Rebsdorf | B29C 53/585 |
| | | | 290/55 |
| 2012/0269634 A1* | 10/2012 | Bortoli | B64D 41/007 |
| | | | 416/170 R |
| 2016/0137308 A1* | 5/2016 | Larson | B64D 41/007 |
| | | | 416/143 |

OTHER PUBLICATIONS

French Preliminary Search Report and Written Opinion for Patent Application No. 1750076; dated Mar. 6, 2019; Report Received Date: Mar. 27, 2019; Attached Translation; 7 pages.

\* cited by examiner

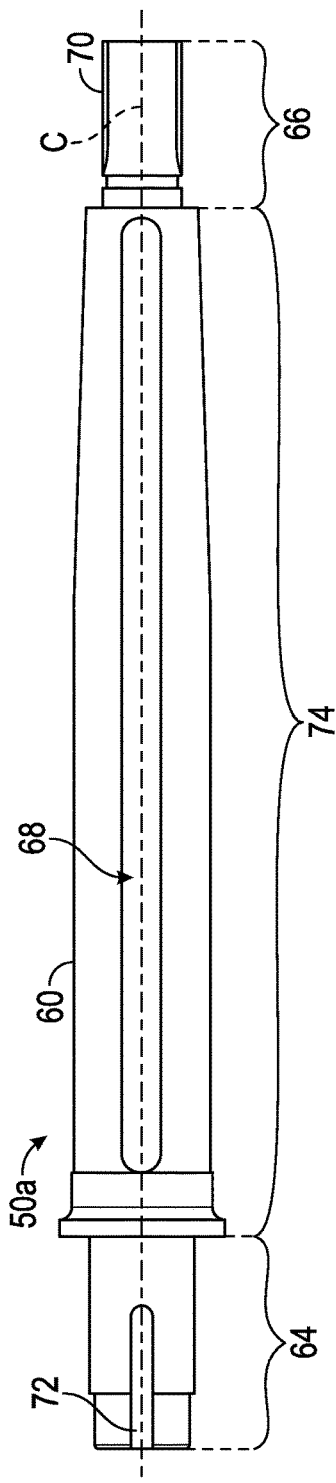
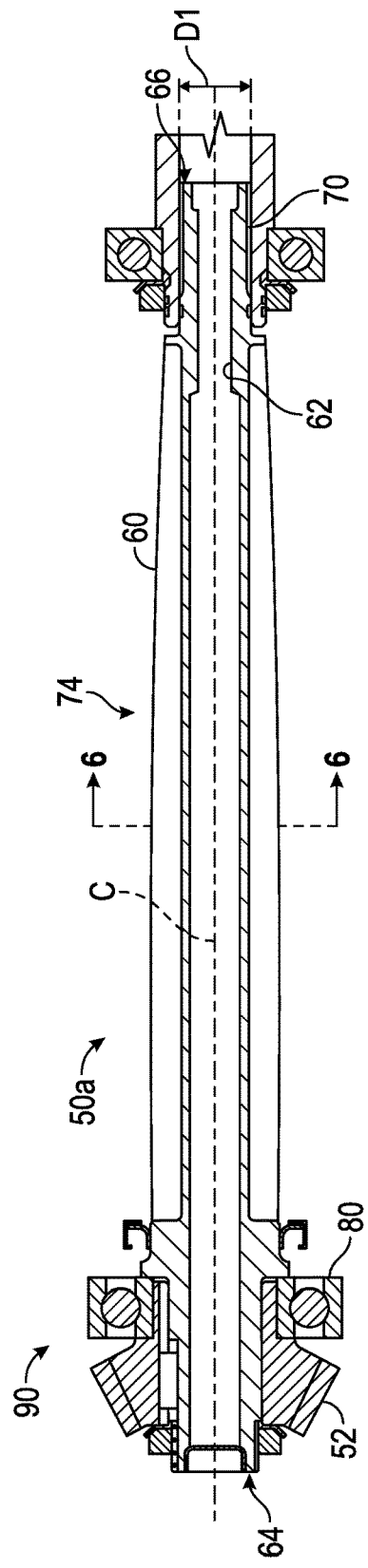
FIG. 4
FIG. 5

US 10,295,042 B2

TUNED RAT DRIVESHAFT

BACKGROUND OF THE INVENTION

Embodiments of this invention generally relate to driveshafts, and more particularly driveshafts for use in Ram Air Turbines (RATs).

RATs are commonly used on modern aircraft to provide a secondary or emergency power source in the event the primary power source is insufficient or fails. A typical RAT includes a turbine that remains internal to the aircraft until needed. When additional power is required, a door in the aircraft's fuselage will open deploying the RAT's turbine into the freestream air. The turbine is rotated by the freestream air and the rotational torque from the turbine is transferred through a drivetrain to be converted into electrical power by a generator. A RAT may also be used to drive a hydraulic pump. When deployed, the rotation of the RAT turbine creates centrifugal loading that causes torsional resonance, vibration and bending issues for the turbine, drivetrain and the generator.

BRIEF DESCRIPTION OF THE INVENTION

A driveshaft for an aircraft ram air turbine, the driveshaft including a cylindrical body having an outer surface, an inner surface, a longitudinal axis, a first end section, a second end section opposite the first end section, and an elongated intermediate section connecting the first end section and the second end section. The outer surfaces of the elongated intermediate section includes at least three separate grooves initiating at a location proximate to the first end section and extending parallel to the longitudinal axis across the outer surface to a location proximate to the second end section, the grooves being separated equidistantly around a circumference of the outer surface. The grooves provide a high lateral bending stiffness and low torsional stiffness such that the drivetrain exhibits a torsional natural frequency below an operating range frequency and a driveshaft critical speed above an operating speed.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a longitudinal view of the driveshaft of FIG. 3, according to an embodiment of the invention;

FIG. 5 is a longitudinal cross-section view of the driveshaft of FIG. 3, along with a pinion gear and a single bearing attached, according to an embodiment of the invention;

The detailed description explains embodiments of the invention, together with advantages and features, by way of example with reference to the drawings.

DETAILED DESCRIPTION OF THE INVENTION

Figure 1:
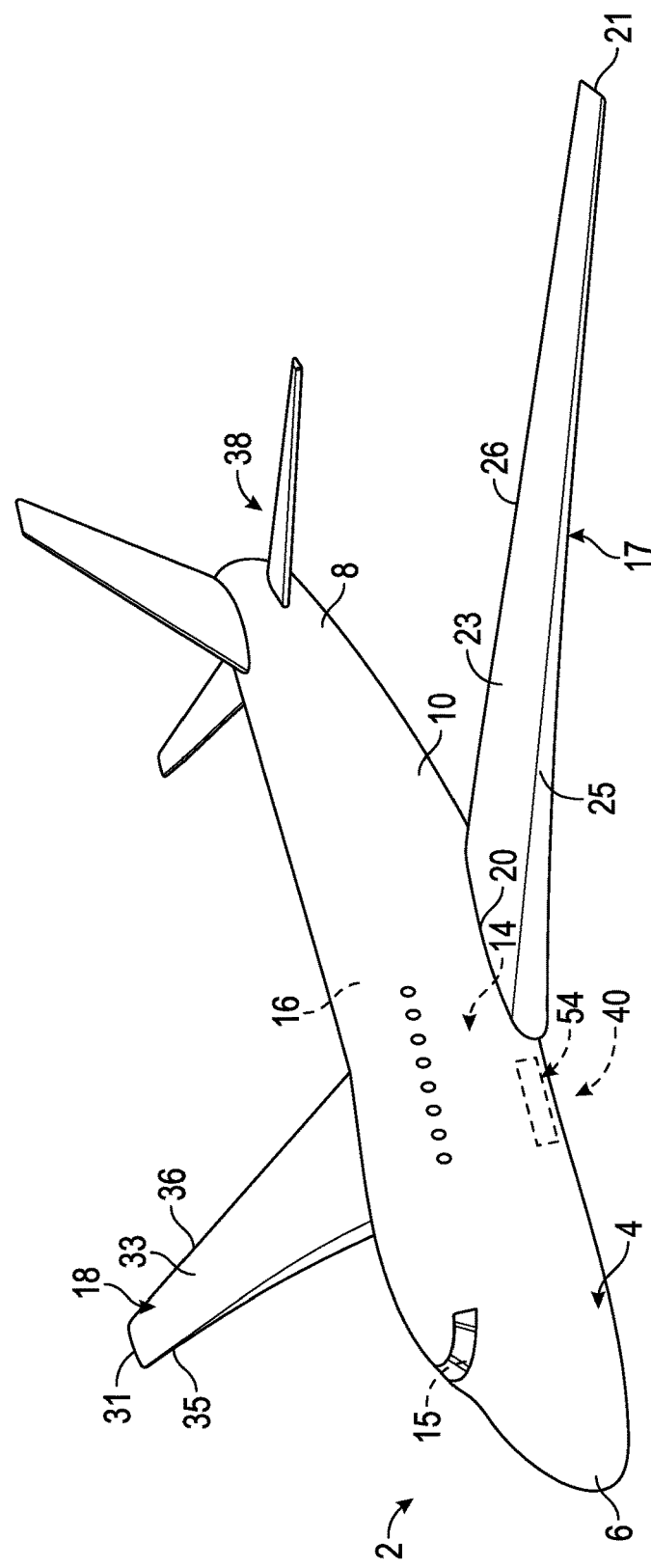
FIG. 1 is a perspective view of an aircraft having a driveshaft for a ram air turbine (RAT) assembly, according to an embodiment of the invention.

An aircraft, in accordance with an embodiment, is indicated generally at 2 in FIG. 1. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38.

Figure 2:
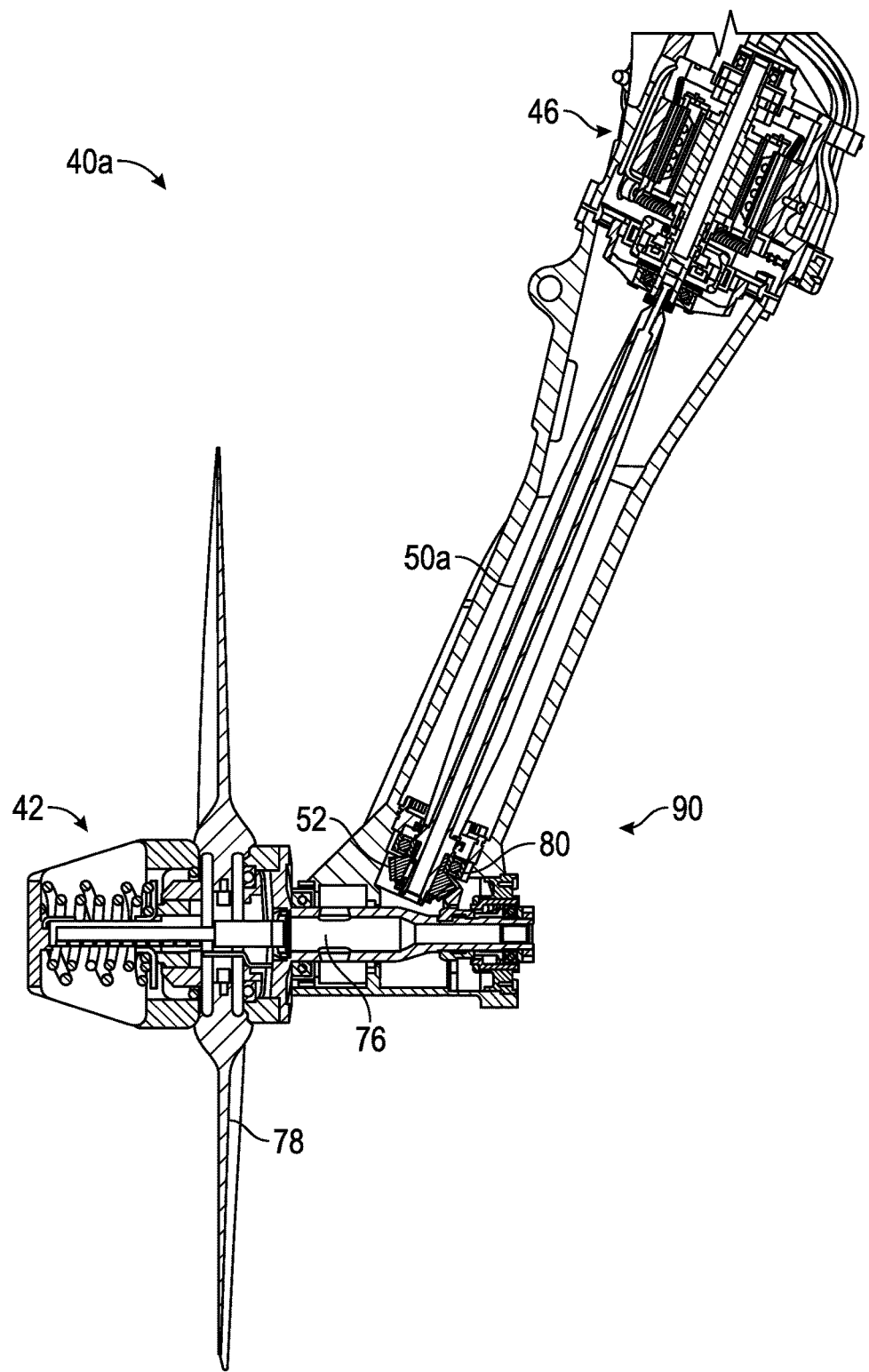
FIG. 2 is a cross-sectional view of a ram air turbine, according to an embodiment of the invention.
Figures 6, 7:
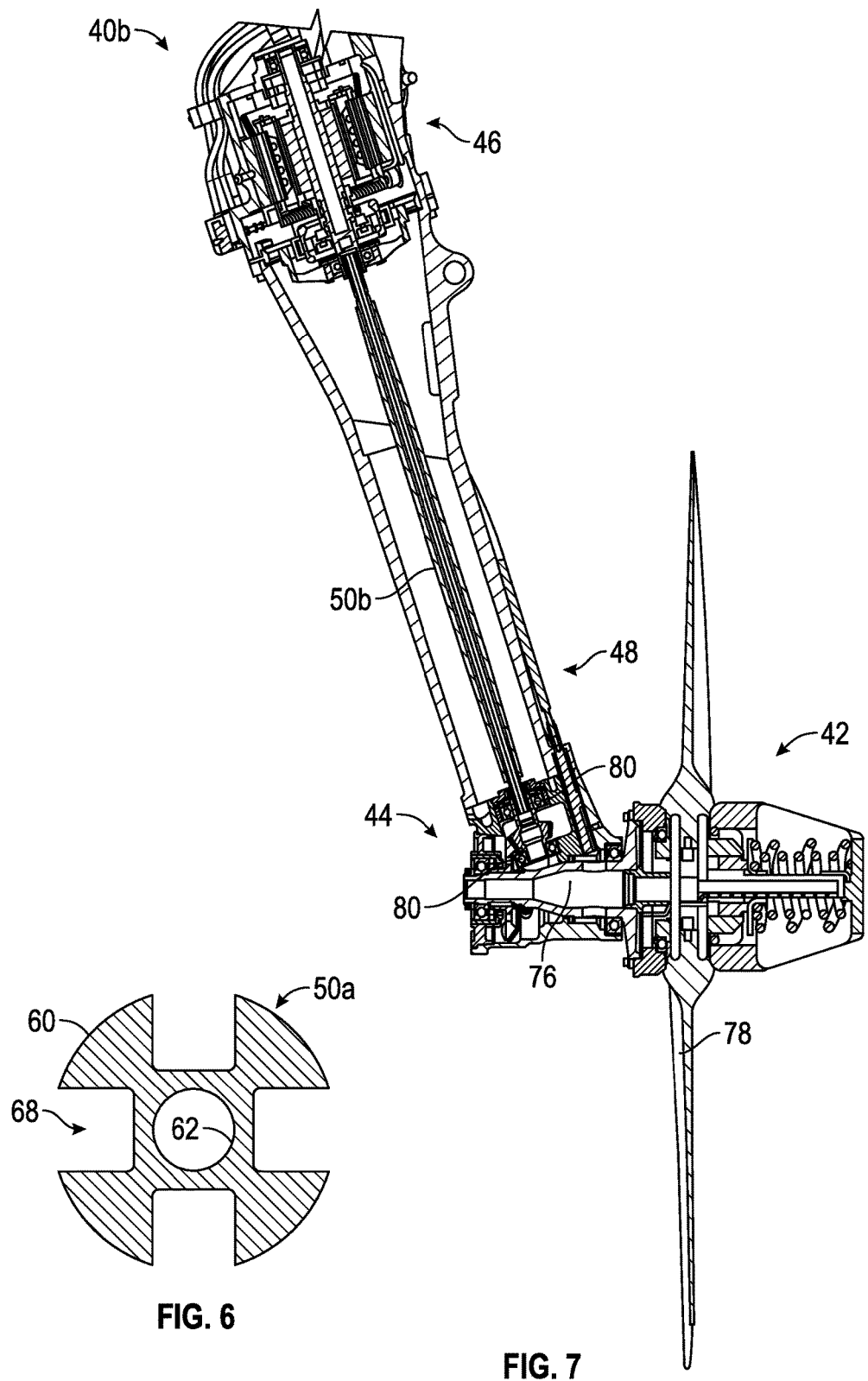
FIG. 6 is an axial cross-section view of the driveshaft of FIG. 3, the driveshaft having rectangular grooves, according to an embodiment of the invention.
FIG. 7 is a cross-sectional view of a ram air turbine, according to an embodiment of the invention.

Aircraft 2 includes a ram air turbine (RAT) assembly 40 mounted within fuselage 4 or nose portion 6. When additional power is required, a compartment door 54 in the fuselage 4 will open deploying the RAT assembly 40 into the freestream air. As shown in FIGS. 2 and 7, the RAT assembly 40 may include a turbine assembly 42, a driveshaft 50 (50a or 50b) and a generator 46. The turbine assembly 42 includes a turbine 78 and turbine shaft 76. The generator 46 may be an electrical generator, hydraulic pump, or both an electrical generator and a hydraulic pump. The turbine assembly 42 is mechanically connected to the generator 46 through the driveshaft 50. As the turbine 78 rotates, the rotational torque is transferred from the turbine shaft 76 to the driveshaft 50 via a pinion gear 52. Driveshaft 50 may be presented in various embodiments including but not limited to driveshaft 50a as seen in FIG. 2 and driveshaft 50b as seen in FIG. 7.

Figure 3:
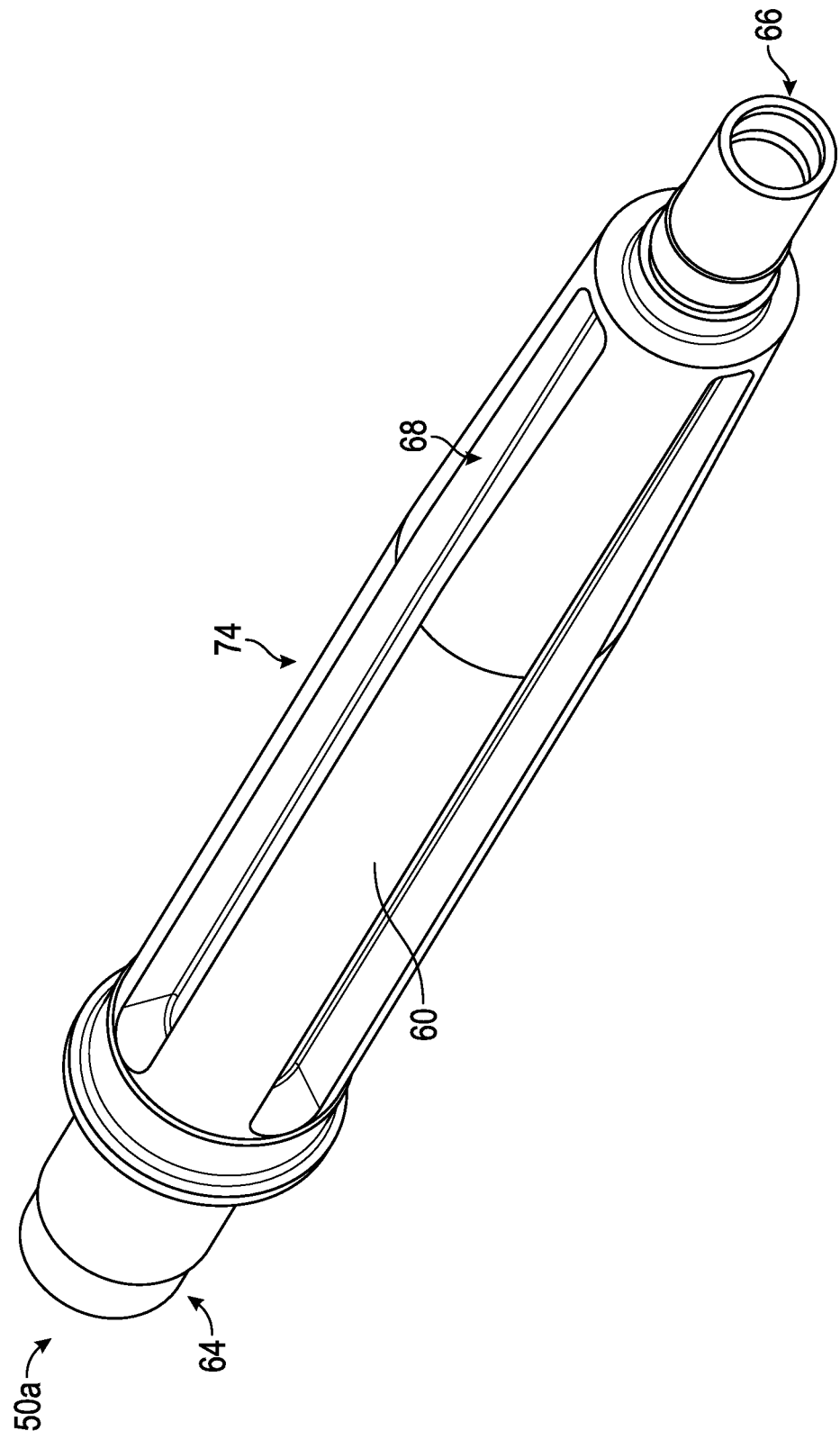
FIG. 3 is a perspective view of a driveshaft of the RAT of FIG. 2, according to an embodiment of the invention.

In one embodiment, the pinion gear 52 may be affixed to the driveshaft 50a. In a further embodiment, a single bearing 80 may be affixed to the pinion gear 52. The assembly of the driveshaft 50a, pinion gear 52 and bearing 80 forms a strut gearbox assembly 90, as seen in FIGS. 2 and 5. In a further embodiment, the pinion gear 52 is secured via a keyway 72 located in the first end section 64 of the driveshaft 50a. In further embodiments, the outer surface 60 of the elongated intermediate section 74 of the driveshaft 50a is tapered towards the second end section 66, as seen in FIGS. 3, 4, and 5. In yet another further embodiment, the driveshaft 50a is configured with a spline 70 at the second end section 66.

Figure 8:
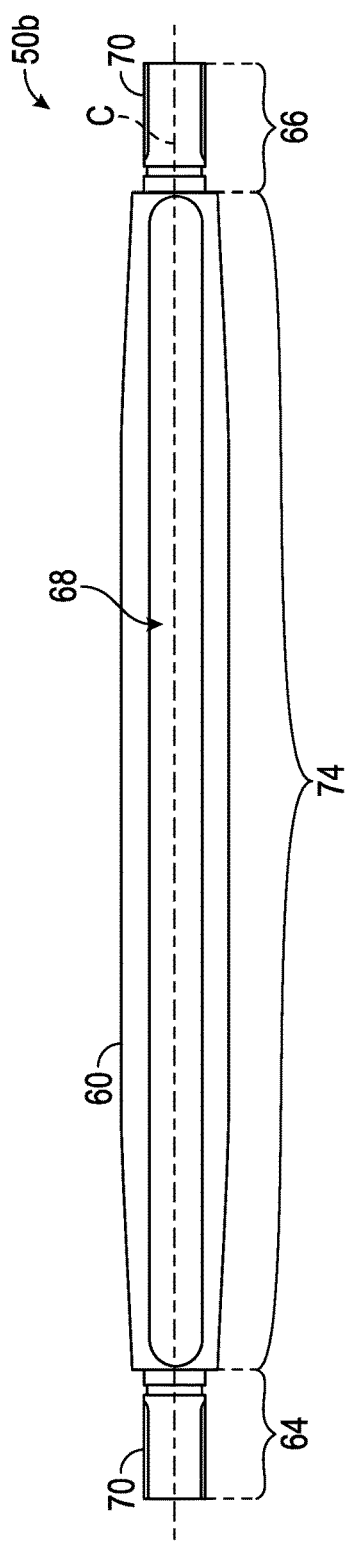
FIG. 8 is a longitudinal view of a driveshaft of the RAT of FIG. 7, according to an embodiment of the invention.
Figure 9:
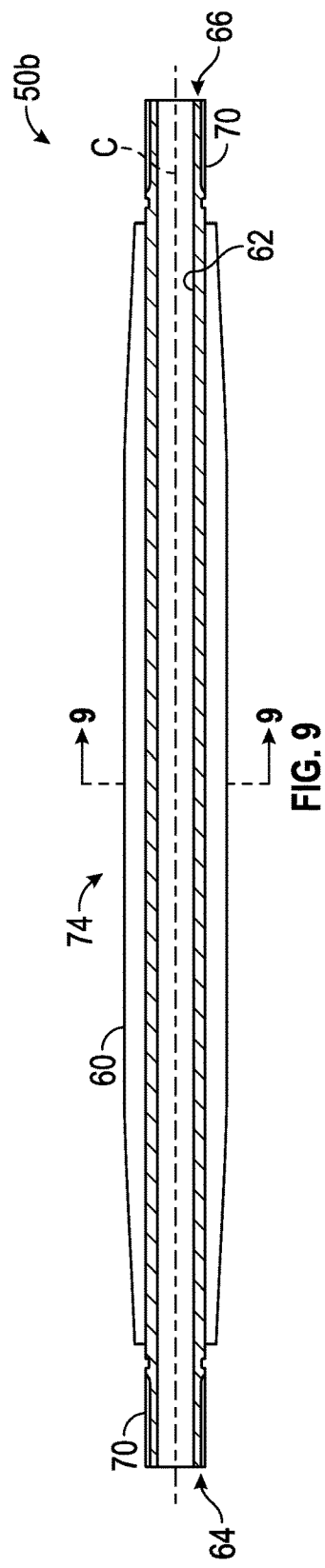
FIG. 9 is a longitudinal cross-section view of the driveshaft of FIG. 8, according to an embodiment of the invention.
Figure 10:
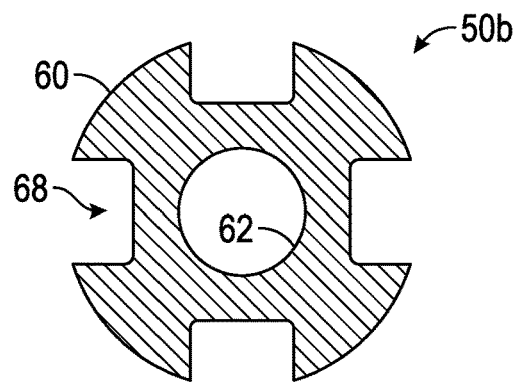
FIG. 10 is an axial cross-section view of the driveshaft of FIG. 8, the driveshaft having rectangular grooves, according to an embodiment of the invention.

In an alternative embodiment, as pictured in FIG. 7, the strut assembly 48 and the gearbox assembly 44 are separate and are connected through splines instead of the combined strut gearbox assembly 90, as pictured in FIG. 2. In this embodiment, the rotational torque is transferred from the turbine assembly 42 through the gearbox assembly 44 to a pinion gear 52 and then to the driveshaft 50b via splines 70 on the first end section 64 of the driveshaft 50b. The rotational torque is then transferred to the generator 46 via splines 70 at the second end section 66 of the driveshaft 50b. In further embodiments, the outer surface 60 of the elongated intermediate section 74 of the driveshaft 50b is tapered towards the second end section 66, as seen in FIGS. 8 and 9. In yet a further embodiment, the outer surface 60 of the elongated intermediate section 74 of the driveshaft 50b is tapered towards the first end section 64, as seen in FIGS. 8 and 9.

Figure 11:
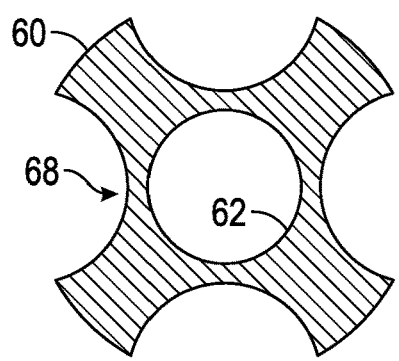
FIG. 11 is an axial cross-section view of a driveshaft of the RAT of FIG. 2 or FIG. 7, the driveshaft having round grooves, according to an embodiment of the invention.
Figure 12:
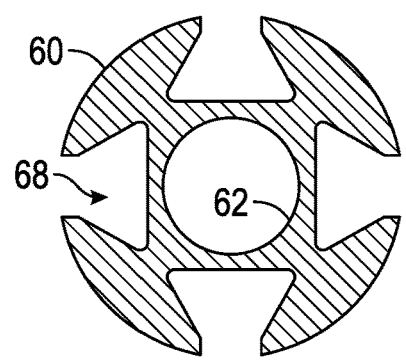
FIG. 12 is an axial cross-section view of a driveshaft of the RAT of FIG. 2 or FIG. 7, the driveshaft having dovetail grooves, according to an embodiment of the invention.

As seen in FIGS. 4, 5, 8, and 9, the driveshaft 50 includes an outer surface 60, an inner surface 62, a longitudinal axis C, a first end section 64, a second end section 66 opposite the first end section 64, and an elongated intermediate section 74 connecting the first end section 64 and the second end section 66. In one embodiment, the outer surface 60 of the elongated intermediate section 74 of the driveshaft 50 further includes at least three separate grooves 68 initiating at a location proximate to the first end section 64 and extending parallel to the longitudinal axis C across the outer surface 60 to a location proximate to the second end section 66, the grooves 68 being separated equidistantly around a circumference of the outer surface 60, as can be seen in FIGS. 3 and 4. The grooves 68 in the driveshaft 50 modify the shaft properties to provide a high lateral bending stiffness and low torsional stiffness such that the drivetrain natural frequency occurs at a frequency below an operating range frequency and at a critical speed for the driveshaft above an operating speed. In various embodiments the grooves 68 could be either rectangular as seen in FIG. 6, rounded as seen in FIG. 11, dovetail as seen in FIG. 12, a splined shape (not shown), a T shape (not shown), or an L shape (not shown).

Traditionally, RATs are configured with a generator 46 located inside the aircraft 2, a long strut assembly 48, and the turbine assembly 42 and gearbox assembly at the end of the strut assembly 48 outside of the aircraft 2. This configuration requires a driveshaft 50 to connect the gearbox assembly 44 with the generator 46. Due to the fact that the turbine assembly 42 is cantilevered away from the gearbox assembly 44, as the turbine 78 spins, centrifugal loading causes the entire turbine assembly 42 to whirl within the bearing clearances, and the gearbox assembly 44 to move in response to a structural resonance. These two motions cause speed variations in the pinion gear 52. The turbine system 42 and generator 46 inertia pair form a spring mass system that resonates as the turbine 78 spins in a phenomenon known as torque ripple. The driveshaft is typically the governing (weakest) spring in the spring mass system. Speed variations of the pinion gear 52 excite a drivetrain resonance to add significant alternating torque to the normal driveline torque. There is significantly less amplification of the gearbox resonance felt by the generator 46 when the drivetrain natural frequency is below the turbine assembly 42 governing range frequency. Consequently, a driveshaft 50 that is compliant in torsion is highly desirable. The driveshaft 50 typically rotates rapidly at the generator 46 speed, which requires the driveshaft 50 to be stiff in lateral bending so that the critical speed is well above the operating range. The requirement for high stiffness in lateral bending often conflicts with the requirement for compliance in torsion.

The RAT drivetrain will experience torque ripple as described above when the pinion gear 52 speeds up and slows down during each revolution of the turbine 78. The torque ripple can be very significant if the pinion gear 52 motions are amplified to greatly increase the loads throughout the drivetrain. Reductions in torque ripple would help lessen the loads on the gears, bearings, splines, and the generator. In turn, lower loads would allow for smaller, lighter parts with less wear and lower peak loads to be implemented throughout the drivetrain of the RAT assembly 40.

As an example, suppose a turbine 46 governs at such RPMs that the once per revolution frequency is in the range of 70 to 110 hertz. The torque ripple forcing function at the pinion 52 is the same 70 to 110 hertz. Assume the driveshaft 50 is designed to achieve 50% frequency separation from the operating range. A soft driveshaft 50 in torsion would be designed for 47 hertz, or a stiffer driveshaft 50 would be designed for 165 hertz. When the frequency ratio is 1.5, the output amplitude is less than the input amplitude for the soft driveshaft 50. However, when the frequency ratio is 1/1.5=0.667 for a stiffer driveshaft 50, there is significant amplification. The amount of amplification is reduced as the shaft is stiffened, but this is often either impractical or the shaft becomes heavy and expensive. The RAT assembly 40 drivetrain torque ripple will be significantly less if a soft driveshaft 50 can be used with a resonance significantly below the operating range. A soft driveshaft 50 is also likely to be much lighter than the stiffer version.

Traditionally, driveshafts 50 are hollow cylinders with a spline 70 on either end. If the cylinder dimensions were made small enough to achieve the desired torsional stiffness, the critical speed of the driveshaft 50 in bending would drop too close to the operating RPM of the driveshaft 50 and render the driveshaft 50 inoperable. A desired driveshaft 50 in the industry would be configured to have the following combination of properties including: a torsional stiffness that such that a drivetrain is tuned to a frequency below the operating range, and the driveshaft at a critical speed that is above the operating speed.

These desired properties are achieved by the grooved driveshaft 50. As seen in FIGS. 3, 4, 8, and 9, the driveshaft 50 has grooves 68 machined along the longitudinal axis C of the shaft. For a given driveshaft 50 outer diameter, the grooves 68 cause a significant change in the torsional stiffness while reducing the bending stiffness by a smaller amount.

The torsional stiffness of various grooved shafts was published by Robert I. Isakower in technical report ARMID-TR-78001, *Design Charts for Torsional Properties of Non-Circular Shafts* (herein incorporated by reference). The torsional stiffness of an example grooved shaft is 1/9.33 times the solid shaft stiffness. The longitudinal bending stiffness is 1/2.07 times the solid shaft stiffness. Thus, the torsional stiffness can be reduced much faster than the loss in the bending stiffness by adding grooves of appropriate geometry. This makes it possible to tune a driveshaft 50 to both the desired torsional stiffness and the desired bending stiffness with grooves 68. Conversely, the torsional stiffness of a traditional circular shaft is directly proportional to the bending stiffness.

The groove 68 quantity, width and depth are all variables that can be adjusted to achieve the desired torsional stiffness and bending stiffness. Groove 68 depth and width are the most common changes for tuning the driveshaft 50. Several possible groove 68 configurations are shown in FIGS. 6, 10, 11, and 12, but other configurations may be used. In one embodiment, there are at least three grooves 68, whereas in another embodiment, there are four grooves or more 68. A design using one groove 68 is unbalanced, and two grooves 68 have a softer bending stiffness in one plane relative to a plane 90 degrees from the first plane. A driveshaft 50 with three or more grooves 68 is equally stiff in all planes. Increasing the number of grooves 68 generally decreases the torsional stiffness. Changing the design of the groove 68 also greatly effects the properties of the driveshaft 50. A rectangular groove 68 or a dovetail groove 68 machines away less material from near the driveshaft 50 outer surface 60 than other configurations to optimize the moment of inertia. A dovetail groove 68 design, as pictured in FIG. 12, is more effective than a rectangular groove 68 design for a greater decrease in torsional stiffness compared to the change in bending stiffness.

Referring specifically now to the embodiment of the driveshaft 50a with a pinion gear 52 and bearing 80 affixed to the driveshaft 50, as pictured in FIG. 5. Having a single bearing 80 requires that the driveshaft 50a act as a long gear support shaft and is not a conventional arrangement for RATS historically. The turbine 78 can accelerate and decelerate rapidly during startup. When the generator 46 has significant inertia, the acceleration and deceleration loads in the drivetrain can be an order of magnitude larger than normal operating loads. The acceleration loads on the teeth of the pinion gear 52 place a large side load on the driveshaft 50a that causes it to deflect. When the generator 46 inertia is high, the driveshaft 50a allows the pinion gear 52 to deflect too far for a good contact pattern on the teeth. The bearing 80 inner races are also rotated at too high of an angle for proper operation. Furthermore, the second end section 66 of the driveshaft 50a with the splines 70 inside the generator 46 is bent far enough to have tooth contact on both ends of the spline 70, which causes high tooth fatigue. The conventional solution would be to use a much larger diameter driveshaft 50a to reduce the deflection but a larger diameter driveshaft 50a is also stiffer in torsion. The same large generator 46 inertia that creates the driveshaft 50a bending problem also causes excessive torque ripple in the drivetrain with a stiff driveshaft 50a. The driveshaft 50a needs to be very stiff in bending to protect the pinion gear 52a, bearing 80 and splines 70, yet soft in torsion to reduce torque ripple torque oscillations. These desired properties are achieved by a driveshaft 50a with tailored grooves 68. A large driveshaft 50 outer diameter provides a high moment of inertia in bending to limit shaft deflection from the pinion gear 52 gear tooth loading. The pinion gear 52 deflection has been reduced to allow a good contact pattern on the pinion gear 52 teeth. The bearing 80 that is mounted on the pinion gear 52 no longer deflects past conventional angular rotation limits. The spline 70 at the second end section 66 has minimal angular deflection, so normal spline 70 tooth contact is reestablished.

The grooves 68 of driveshaft 50a allow the torsional stiffness to be precisely tuned to a natural frequency that is lower than the governing range frequency of the turbine assembly 42. The number of grooves 68 can vary but the number of grooves 68 should be at least three, as mentioned earlier. In one embodiment, the driveshaft 50a has four grooves 68 in order to ease the manufacturing process by keeping the cutter size large enough for rapid material removal. Four grooves 68 also provide the desired torsional stiffness. In a further embodiment, the driveshaft 50a has a (Groove Depth)/(Driveshaft Radius) ratio larger than 0.4, which requires a driveshaft 50a with the large outer diameter to minimize bending and be soft enough in torsion.

In yet another embodiment, the outer surface 60 of the elongated intermediate section 74 is tapered (gets narrower) towards the second end section 66 of the driveshaft 50a. This taper is beneficial because the pinion gear 52 loading that causes the deflection problem is a concentrated load towards the first end section 64 of the driveshaft 50a. A smaller moment of inertia is needed at the second end section 66 than the first end section 64 to resist deflection. The taper serves to maintain the driveshaft 50a stiffness where it is needed most by increasing the outer diameter near the first end section 64 while simultaneously saving weight by reducing the outer diameter near the second end section 66.

In further embodiments, the tubular cross section of the second end section 66 uses as large an outer diameter D1 as will fit within the mating generator 46 splines to further minimize spline 70 deflection. If the outer diameter D1 decreases in size then the spline 70 will deflect too far.

In further embodiments, the hole inside the driveshaft 50a section is machined from the first end section 64 rather than the second end section 66. This hole, which forms the inner surface 62, helps to tune the torsional natural frequency and reduce weight, while having little effect on the bending natural frequency.

The term "about" is intended to include the degree of error associated with measurement of the particular quantity based upon the equipment available at the time of filing the application. For example, "about" can include a range of ±8% or 5%, or 2% of a given value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A driveshaft for an aircraft ram air turbine, the driveshaft comprising:
    a cylindrical body having an outer surface, an inner surface, a longitudinal axis, a first end section, a second end section opposite the first end section, and an elongated intermediate section connecting the first end section and the second end section,
    wherein the outer surfaces of the elongated intermediate section includes at least three separate grooves initiating at a location proximate to the first end section and extending parallel to the longitudinal axis across the outer surface to a location proximate to the second end section, the grooves being separated equidistantly around a circumference of the outer surface,
    wherein the grooves provide a high lateral bending stiffness and low torsional stiffness such that a drivetrain natural frequency occurs at a frequency below an operating range frequency and at a critical speed for the driveshaft above an operating speed, and
    wherein the outer surface of the elongated intermediate section is tapered towards the second end section.

2. The driveshaft of claim 1, wherein:
    the grooves are configured in at least one of a rectangular shape, a round shape, a dovetail shape, a splined shape, a T shape, and an L shape.

3. The driveshaft of claim 2, further includes:
    a plurality of splines located around the outer surface of the second end section.

4. The driveshaft of claim 3, further includes:
a plurality of splines located around the outer surface of the first end section.

5. The driveshaft of claim 4, wherein:
the outer surface of the elongated intermediate section is also tapered towards the first end section.

6. The driveshaft of claim 1, further including:
a pinion gear affixed to the first end section.

7. The driveshaft of claim 6, further including:
a bearing affixed to the pinion gear.

8. A ram air turbine comprising:
a turbine assembly mechanically connected to a power conversion device through a driveshaft, the driveshaft comprising:
   a cylindrical body having an outer surface, an inner surface, a longitudinal axis, a first end section, a second end section opposite the first end section, and an elongated intermediate section connecting the first end section and the second end section,
   wherein the outer surface of the elongated intermediate section includes at least three separate grooves initiating at a location proximate to the first end section and extending parallel to the longitudinal axis across the outer surface to a location proximate to the second end section, the grooves being separated equidistantly around a circumference of the outer surface,
   wherein the grooves provide a high lateral bending stiffness and low torsional stiffness such that a drivetrain natural frequency occurs at a frequency below an operating range frequency and a critical speed for the driveshaft above an operating speed, and
   wherein the outer surface of the elongated intermediate section is tapered towards the second end section.

9. The ram air turbine of claim 8, wherein:
the grooves of the driveshaft are configured in at least one of a rectangular shape, a round shape, a dovetail shape, a splined shape, a T shape, and an L shape.

10. The ram air turbine of claim 9, wherein the driveshaft further includes:
a plurality of splines located around the outer surface of the second end section.

11. The ram air turbine of claim 10, wherein the driveshaft further includes:
a plurality of splines located around the outer surface of the first end section.

12. The ram air turbine of claim 11, wherein:
the outer surface of the elongated intermediate section of the driveshaft is also tapered towards the first end section.

13. The ram air turbine of claim 8, further including:
a pinion gear affixed to the first end section of the driveshaft.

14. The ram air turbine of claim 13, further including:
a bearing affixed to the pinion gear.

* * * * *